United States Patent [19]

Fidrych

[11] 4,453,291

[45] Jun. 12, 1984

[54] GRIP FOR PULLING FIBER OPTIC CABLE

[75] Inventor: Alfred W. Fidrych, Stonington, Conn.

[73] Assignee: Harvey Hubbell Incorporated, Orange, Conn.

[21] Appl. No.: 390,307

[22] Filed: Jun. 21, 1982

[51] Int. Cl.³ .................................................. F16G 11/00
[52] U.S. Cl. ................................. 24/115 N; 24/122.3; 24/122.6; 24/135 N; 294/86 CG
[58] Field of Search .............. 24/122.3, 122.6, 115 N, 24/135 N; 294/86 CG

[56] References Cited

U.S. PATENT DOCUMENTS

| | | | |
|---|---|---|---|
| 1,686,250 | 10/1928 | Page | 24/115 N |
| 1,807,993 | 6/1931 | Martin | |
| 1,994,674 | 3/1935 | Van Inwagen, Jr. | 24/113 |
| 2,017,625 | 10/1935 | Kellems | 294/86 CG |
| 2,112,281 | 3/1938 | Ferris | 24/123 |
| 2,327,831 | 8/1943 | Sutton | 24/122.6 |
| 2,602,207 | 7/1952 | Kellems | 24/123 |
| 2,642,767 | 6/1953 | Kester | 24/135 N |
| 2,698,150 | 12/1954 | DiPalma | 24/115 N X |
| 2,740,178 | 4/1956 | Kellems | 294/86 CG |
| 2,766,501 | 10/1956 | Kellems | 24/123 |
| 3,343,231 | 9/1967 | Clay | 24/115 N |
| 3,431,947 | 3/1969 | Hines | 24/115 N X |
| 3,551,959 | 1/1971 | Mastalski | 24/123 |
| 3,570,074 | 3/1971 | Schimmeyer et al. | 24/122.6 |
| 4,055,875 | 11/1977 | Strickland | 24/115 N X |
| 4,368,910 | 1/1983 | Fidrych | 24/115 N |

FOREIGN PATENT DOCUMENTS 627278  8/1949  United Kingdom ............ 24/115 N Primary Examiner—Victor N. Sakran
Attorney, Agent, or Firm—Jerry M. Presson

[57] ABSTRACT

A grip for cable, especially fragile cable such as fiber optic cable having a fragile connector at one end thereof. The grip comprises an elongated, hollow protective sheath with an open rearward end for receiving the connector therein, a pulling device coupled at the forward end of the sheath by means of a forwardly tapered nose piece and an open mesh sleeve coupled at the rearward end of the sheath for engaging the cable upon a longitudinal stretching thereof which radially reduces the sleeve around the cable. The pulling device comprises a shaft journalled for free rotation on the nose piece by ball bearings mounted in the nose piece to allow the sheath to rotate about its longitudinal axis as it is being pulled. A portion of the sheath body is made flexible to facilitate its movement through curved conduits and other curved passageways and the mesh sleeve is detachably coupled to the rearward end of the sheath to facilitate the manual detachment of the sleeve for ease of loading the connector into the rearward end of the sheath.

16 Claims, 5 Drawing Figures

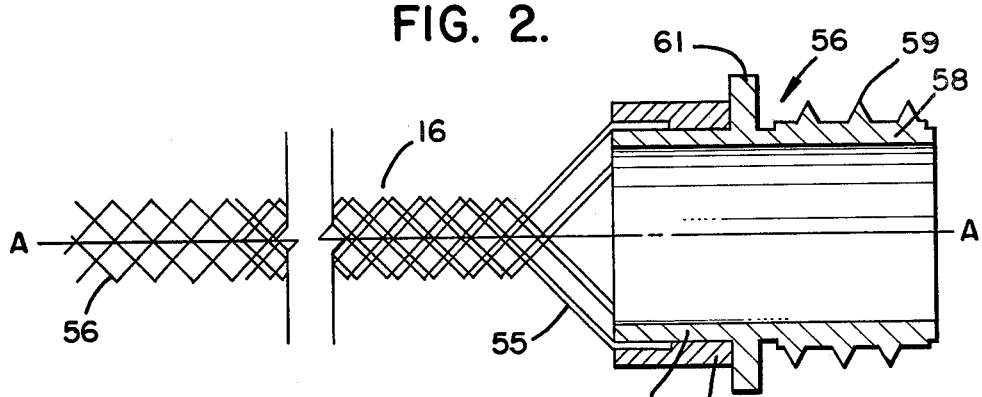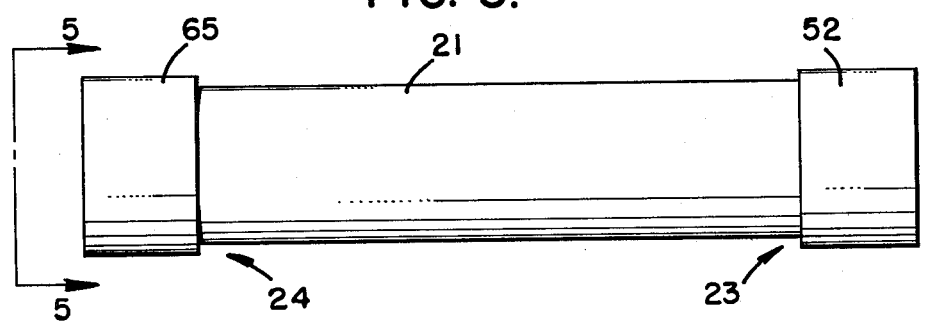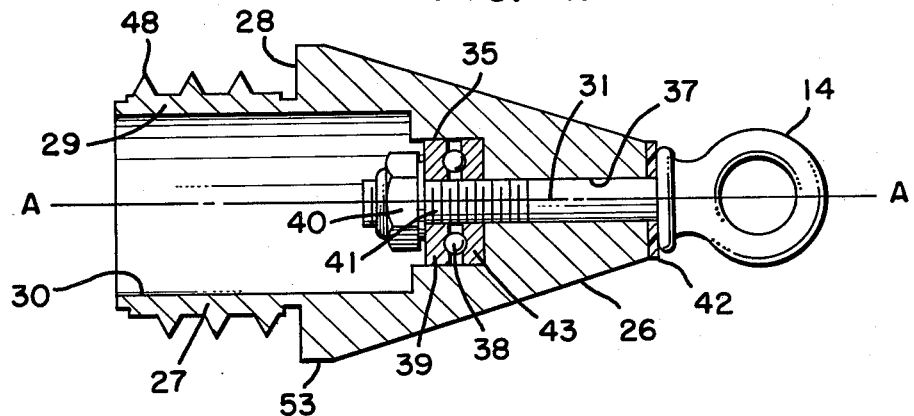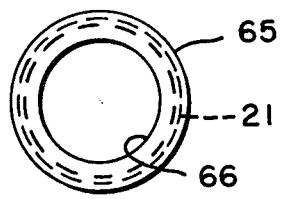

GRIP FOR PULLING FIBER OPTIC CABLE

FIELD OF THE INVENTION

The present invention relates to a grip for pulling fragile cable and especially fiber optic cable having one or more fragile connectors at the end thereof. The grip includes an elongated, hollow protective sheath open at a rearward end to receive the connector end of the cable, a pulling device coupled at the forward end of the sheath for pulling the sheath, and a mesh sleeve coupled at the rearward end of the sheath for gripping the cable. A portion of the sheath is made flexible to facilitate its movement through conduits and other passageways. The mesh grip is detachably coupled to the rearward end of the sheath to permit its manual removal and facilitate access to the rearward end of the sheath.

BACKGROUND OF THE INVENTION

Cable grips for pulling, holding and supporting elongated objects such as cables, ropes and the like are well known in the art. These grips typically comprise an open mesh sleeve formed from braided or interwoven metallic wire strands which may be expanded radially by longitudinal compression to enable them to readily receive the cable and radially contracted by longitudinal stretching to frictionally engage the periphery of the cable. Tensile forces tending to separate the grip from the cable or to move the grip along the cable produce a firmer gripping of the cable.

Such grips are suitable for the fairly rugged electrical cable, but significant problems arise when the cable to be pulled is fragile. An example of the latter is fiber optic cable which comprises a flexible jacket encasing a single optical fiber or a bundle of optical fibers therein. Such fragile cable can be easily crushed or its optical characteristics can be distorted if the radial compressive forces on the cable are localized and become too great. Also, the optical fiber can be easily broken when subjected to excessive bending forces. In addition, it is typical to have pre-assembled on the end of fiber optic cable one or more fragile optical connectors receiving one or a bundle of optical fibers therein and secured by an epoxy resin and a crimp. This fragile connector is highly susceptible to crushing radial compressive forces as well as longitudinal tensile forces which could easily snap the connector from the cable. Moreover, the facial end of the connector must be protected from damage which would deleteriously affect its optically finished surface.

Moreover, fiber optic cable is much smaller in diameter than the typical electrical cable. These small diameters in most cases are much less than the conventional wire mesh grips can adequately hold. Also, the fiber optic connector at the end of the fiber optic cable has a much larger outside diameter than the cable so that a conventional grip selected to fit and adequately grip the cable cannot expand enough to accept the larger connector diameter or diameters. Conversely, a grip designed to receive a large diameter connector cannot compress enough to grip the smaller cable diameter. A typical example is a connector with a 0.5 inch outer diameter and a cable with a 0.073 inch outer diameter.

A method presently used to protect a fiber optic cable connector during pulling comprises wrapping the connector in a layer of foam rubber and then inserting this into a plastic sleeve which in turn is inserted into an oversized wire mesh grip. This method, however, is expensive and time consuming since conventional wire mesh grips are relatively stiff, thereby creating extreme difficulty in inserting the small and flexible cable with a connector attached. In addition, after assembly of this combination, the holding capability of the oversized wire mesh is marginal and may allow slippage of the cable and pulling out of the pre-assembled connector.

In addition to these qualifications, a grip for pulling fiber optic cable must adequately grip the cable and not damage the cable or the connector. There are four basic cable configurations that must be contended with by the grip designer. The first is a cable by itself, containing one or a plurality of fiber optic cables all without preassembled connectors. This provides only one rather uniform diameter for the grip to contend with.

A second configuration involves a single fiber optic cable with a preassembled connector, with both the cable and the connector diameter being within the grip diameter range so that the grip can be compressed longitudinally and therefore expand sufficiently in the radial direction to accept the combined cable and connector and also then be stretched longitudinally to thereby reduce the radius of the wire mesh into a sufficient gripping engagement of the cable.

A third cable configuration involves a single fiber optic cable with a preassembled connector where the connector size is beyond the expansion of the wire mesh that is made to suit the cable diameter. Lastly, a fourth basic cable configuration involves a plurality of fiber optic cables with preinstalled conconnectors where the connector diameter build-up is beyond the expansion capability of the wire mesh.

In my copending U.S. patent application Ser. No. 213,856 filed Dec. 8, 1980 and assigned to the same assignee as the instant application, there is disclosed a cable grip which is especially suitable for pulling fiber optic cables and provides the necessary protection to the fragile connector ends of such cables by means of a tubular protective sheath. The particular embodiment of the sheath disclosed in that patent application is one of a rigid metal body formed of, for example, metal tubing. While this particular embodiment of a sheath body provides excellent protection for the fiber optic connector inserted therein, for certain installations involving angled or curved conduits through which the cable must be pulled, a sharp curvature of the conduit walls may pose an obstruction to the passage of an elongated rigid tubular member.

SUMMARY

Accordingly, it is an object of the present invention to provide a hollow, elongated sheath having an open, rearward end for receiving and protecting the connector end of a fiber optic cable insertable therein, wherein a portion of the sheath is substantially flexible in directions transverse to its longitudinal axis facilitate its bending around curved conduit walls and the like.

Another object of the present invention is to provide a mesh grip for pulling cable and especially fiber optic cable with at least one fiber optic connector at the end thereof, wherein the grip is readily detachable from an end of a hollow, open-ended sheath protecting the fiber optic connector to facilitate the insertion of the cable connector end into the end of the sheath.

Another object of the present invention is to provide a grip that protects the end of a fragile cable by a flexible, encasing sheath body which utilizes predetermined lengths of commercially available flexible metallic conduit as the sheath body, thereby facilitating the manufacture of the grip.

The foregoing objects are attained in accordance with the instant invention by providing an elongated grip for pulling fragile cable comprising a hollow protective sheath having a forward end and a rearward end and formed in part by a cylindrical midsectional body having a longitudinal axis. The body is designed to be substantially flexible to bending in directions transverse to its longitudinal axis so that the sheath can be snaked through curved conduit walls and other passageways. The sheath body may be formed from several lengths of commercially available longer lengths of flexible metallic conduit or hose which is sold by several manufacturers. Characteristically, this type of conduit sheath is also smooth, pliable and compressible to some extent; all features which make its use particularly suitable for certain pulling grip applications. The rearward end of the sheath is open for the reception of the fragile cable therein.

A tensioning device is rotatably coupled to the forward end of the sheath and wire mesh cable gripping sleeve is readily detachably coupled at its forward end to the sheath. The readily detachable coupling allows quick manual removal of the sleeve from the sheath thereby facilitating on-site loading of a cable connector into the sheath. The detachable coupling of this invention may also be used on formed rigid tubing sheaths, such as disclosed in my aforementioned copending patent application in lieu of swaged couplings which are not normally detachable from the sheath body.

Advantageously, the forward end of the sheath is provided with an inwardly tapered lead for creating an opening for the fiber optic when pulled through a conduit containing a number of existing cables. The pulling device comprises an eyelet rotatably connected at the forward end of the sheath by a low-friction ball bearing to efficiently alleviate torsional stresses on the encased fragile cable during a pulling operation.

Other objects, advantages and salient features of the present invention will become apparent from the following detailed description which, taken in conjunction with the annexed drawings, discloses preferred embodiments of the present invention.

DRAWINGS

Referring now to the drawings which form a part of this original disclosure:

FIG. 2 is an enlarged, longitudinal cross-sectional view of the mesh grip coupling shown in FIG. 1:

Figure 1:
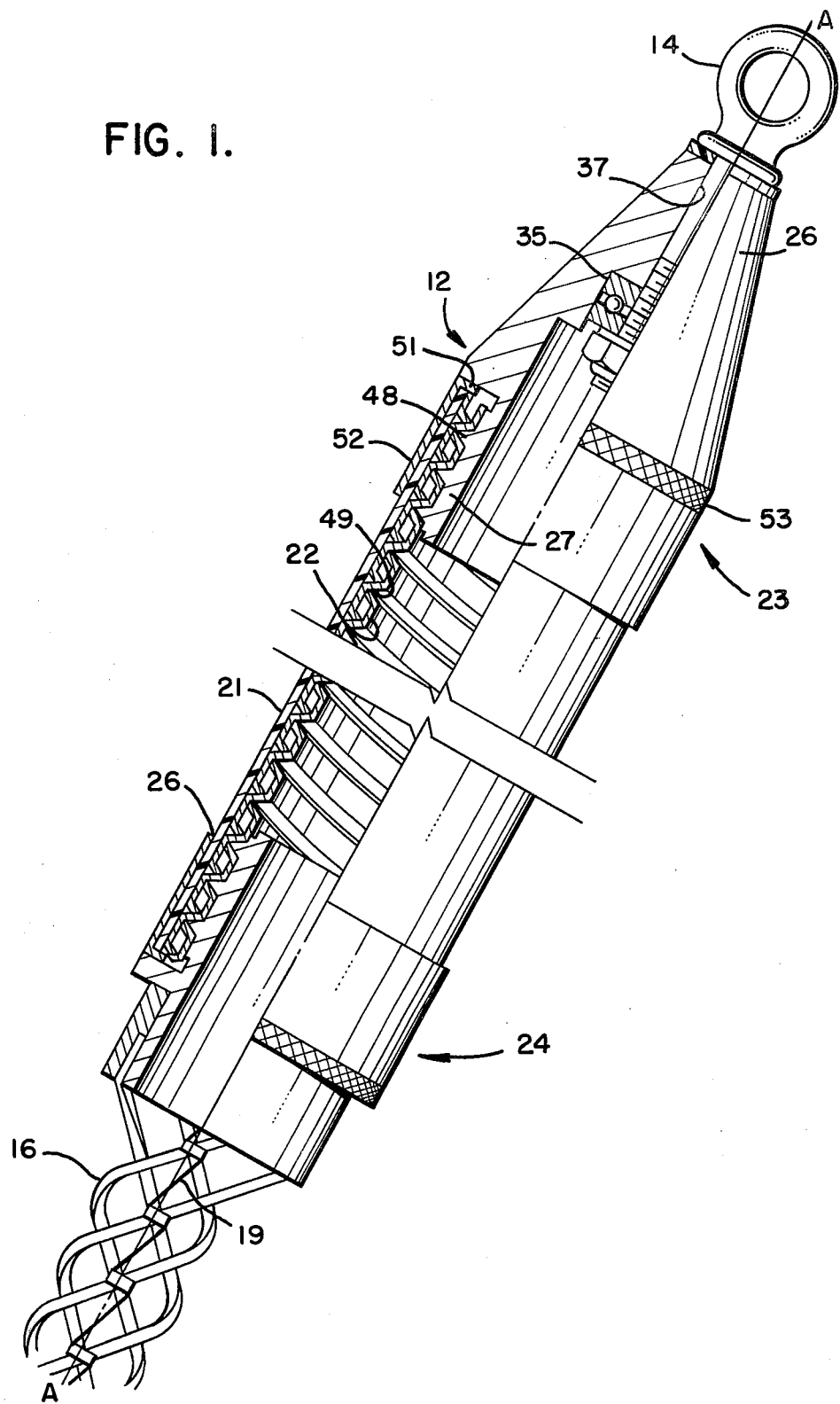
FIG. 1 is a plan view of the grip constructed in accordance with the present invention showing a protective sheath and portions of a mesh grip coupling in section with the upper quarter portion of the protective sheath shown in cross section.

FIG. 3 is a longitudinal view of the flexible sheath body portion of the grip shown in FIG. 1 with end caps attached; and FIG. 4 is an enlarged cross-sectional view of the nose end of the protective sheath shown in FIG. 1 depicting a ball-bearing arrangement for providing a low-frictional rotatable mounting for a pulling eyelet, and FIG. 5 is a plan view of one end of the sheath body and its end cap as shown in FIG. 4.

DETAILED DESCRIPTION OF THE INVENTION

A grip constructed in accordance with the present invention has particular application to gripping fragile cables and as seen in FIG. 1 comprises a protective sheath 12, a pulling eyelet 14 coupled to one end of the sheath, and a braided or woven open mesh sleeve 16 detachably coupled to the opposite end of the sheath 12.

The mesh sleeve 16 is typically formed from a plurality of interwoven metallic wire strands and is split along the longitudinal axis A—A of the grip as seen in FIG. 1 for receiving a cable (not shown) which is to be gripped by the strands. To enclose the grip about a cable placed therein, the two loop edges may be drawn together about the longitudinal axis A—A and interconnected by a strand 19. When the sleeve is compressed along its longitudinal axis A—A, it increases in size radially to receive a conventional fragile cable with one or more fragile connectors at the end thereof. Once suitably placed therein, the sleeve 16 can be axially stretched which results in a reduction of its size radially into a gripping action on the fragile cable.

The fragile cable may be, a fiber optic cable comprising a flexible, resilient jacket encasing a plurality or bundle of individual, hollow glass tubes constituting the optical fibers. The fragile connector is basically a cylindrical member having an internal cylindrical bore for receiving the optical fiber therein, these fibers typically being secured thereto by epoxy as well as a crimp surrounding a short fragile tube extending from the main cylindrical member of the connector. A cable of this type is described in my copending patent application, Ser. No. 340,900 filed Jan. 20, 1982 and assigned to the same assignee as the instant invention and as is known to those working in the fiber optic art, the facial end of the connector is optically finished to receive and transmit the optical signals in the tybes and hence, should be protected from extraneous foreign matter and impacts with obstructions when it is pulled through conduits, passageways and the like.

As seen in FIGS. 1 and 3, the protective sheath 12 is comprised of a hollow tubular body 21 having a substantially cylindrical interior chamber 22 which has a forward end 23 and a rearward end 24. The diameter of the chamber 22 may be large enough to enclose one or more fiber optic cables having a cluster of two or more connectors attached to one end of each cable.

In accordance with this invention, the sheath body 21 is preferably comprised of a flexible hose or conduit which will pass more easily through conduits and passageways which include curvatures such as elbows or bends therein or for any applications where the ability of the sheath to bend or flex in directions transverse to the longitudinal axis is a desired or required feature.

The sheath body may be readily formed from a length A—A of commercially available flexible conduit. Such conduit is characterized as having an outer sleeve or covering composed of a synthetic rubber-like plastic material 25 which is resilient, smooth and compressible, and a corrugated inner flexible metallic tube 26 which is concentric about the axis A—A. The tube 26 is conveniently formed by helically winding a longitudinally corrugated metal strip onto a mandrel such that the adjacent edges of the strip overlap one another to form a continuous, helically seamed joint concentric about the axis A—A. The helical joint forms an internal helical groove or female thread which may be threadedly engaged by circumferentially threaded members having male threads thereon of the same pitch and hand as that of the female conduit thread. This feature of the metallic conduit is used herein to effect threaded connections between the sheath body 21 and the opposite nose and mesh ends of the sheath. In addition, the body 21 may be obtained by cutting off desired sheath lengths from one or more rolls of commercially-available conduit of appropriate internal diameter. Such ready availability of a suitable component for a major part for the sheath facilitates manufacture of the grip for any desired application.

The forward end 23 of the sheath includes an inwardly tapered conical nose 26 which is threadedly coupled to the forward end of the sheath body 21 by an externally threaded hollow ferrule 27. The nose is subjected to components of tensile force and is formed of a rigid metal or plastic material which can resist such component forces. Formed in the rearward end of the nose 26 (FIGS. 1 and 4) is an interior cylindrical cavity 35. This cavity is concentric with the longitudinal axis A—A of the nose 26 and is also concentric with a cylindrical bore 37 extending through the nose 26 which is concentric with the axis A—A. The nose is provided with a smooth exterior surface to facilitate its movement through conduits, passageways and openings and past other cables which may be contained therein.

The eyelet 14 is formed of a rigid material such as steel, having a shaft 31 mounted in the cylindrical bore 37 for free rotation concentric with the longitudinal axis A—A. One or more roller bearings 38 are mounted in the cavity and the shaft 31 is rotatably mounted in the bearing 38 against forwardly directed components of tensile forces by a locking cap nut 40 threadedly connected to the threaded distal end 41 of the shaft 31 and abutting the rearward bearing journal 39 of the bearing 38. With the eyelet 14 attached to a rope, line or other pulling means, the nose 26 can unwind relatively freely while under tensile loading as a result of turning movements imparted to the sheath by a torsionally-stressed fiber optic cable or by the pulling line. The forward journal 43 of the bearing 38 is seated against the bottom wall of the cavity 35 adjacent the bore 37 so the nut 40 and the eyelet shaft 31 cannot be pulled forwardly and away from the sheath 12 under tensile loading. As a buffer against significant frictional engagement between the eyelet 14 and nose 26, an annular disc 42 composed of a low-frictional material, such as nylon, is mounted concentrically on the shaft 31 between those parts.

The nose 26 (FIG. 4) is formed with a radially inwardly stepped, circumferential shoulder 28 which extends inwardly from the nose circumference the entire thickness of the sheath body 21 and additionally slightly further inwardly thereof. The shoulder 28 commences the rearward part of the nose comprising the externally threaded hollow ferrule or coupling 27. The ferrule 27 has a circumferentially threaded end 29 and an internal chamber 30 of substantially cylindrical shape concentric with the bearing cavity 35. The chamber 30 has an internal diameter which is slightly less than the internal diameter of the sheath body 21 to accommodate, if necessary, the lead end of the cable inserted into the sheath 12.

The threaded end 29 of the ferrule 27 is typically comprised of a continuous helical male thread having three or four thread convolutions 48 of the same pitch and hand as the internal female thread convolutions 49 formed by the continuous metal corrugations of the sheath body and may be of a modified Acme screw type. The outer or pitch diameter of the male thread convolutions 48 is only slightly less than the root diameter of the female thread convolutions 49 of the corrugations with which they mate so that a relatively tight threaded connection can be effected between the two threads. The nose 26 is rotated about the longitudinal axis A—A in an appropriate direction until three or more male thread convolutions 48 are engaged by the female thread convolutions at which point, the shoulder 28 is displaced axially into abutment with an inwardly extending flange 51 of an end cap 52 to secure the end cap 52 in position between the nose and sheath body. To facilitate manual turning of the nose 26, an annular circumferential strip can be knurled as indicated by numeral 53.

As seen in FIG. 2, the mesh sleeve 16 has a lead end 55 and a tail end 56, the mesh lead end 55 thereof being concentrically positioned with respect to the longitudinal axis A—A.

The end 55 is comprised of a hollow, metal ferrule 56 having a hollow, threaded end 58 typically formed by a helical thread having three or four circumferential helical thread convolutions 59 for engaging three or four of the rearwardmost female thread convolutions 49 at the rearwardmost end of the sheath body 10. Because of the female thread provided by these usually has a substantially constant pitch and internal diameter throughout the entire length of the sheath body, the threaded end 58 of the ferrule 56 may be formed with a male thread of the same pitch and hand as on the nose ferrule 27.

To provide an abutting shoulder essentially equivalent to the shoulder 28, the forwardmost end of a cylindrical knurled collar 60 extends far enough inwardly to abut a flange 63 of an end cap 65 when the ferrule is rotated in an appropriate direction to threadedly engage the three or four female thread convolutions.

An annular collar 70 is mounted on the smooth, exterior surface of rearward section 71 of the ferrule 56, the sleeve ends being sandwiched between the exterior surface of the section 71 and the interior surface of the collar. The collar 70 rigidly couples the sleeve to the ferrule 56 by means of a swaging operation and extends longitudinally far enough inwardly to abut the end cap 65 when the proper threaded connection is made between the female thread on the sheath body and the male thread on the ferrule 56. So as not to pose any outwardly extending obstruction on the grip, the outer diameter of the collar 70 is slightly less than the outer diameter of the end cap 65.

As mentioned briefly hereinabove, forward and rearward ends of the sheath body are each constrained against radially outward expansion by the cylindrical cup-shaped end caps 52 and 65, respectively. The end caps 52 and 65 are essentially identical in size and shape and the inner diameter of each cap is slightly greater than the outer diameter of the respective ends of the sheath body so that the sleeves fit tightly over the ends of the resilient and the radially expandable sheath material at the sheath body ends to prevent any appreciable, radially outward displacement or buckling of these sheath ends and the underlying metallic corrugations.

Such radially outward displacement of the sheath body ends. might otherwise develop when radially-outwardly directed components of forces are developed and applied against the internal thread surfaces of the corrugations by the inclined ferrule thread convolutions bearing thereagainst when the grip is pulled longitudinally. The radially, inwardly-extending flanges 51 and 66 of the caps 52 and 65 respectively, are formed with circular concentric openings both concentric with the longitudinal axis A—A of the sheath body. The internal diameter of the openings in both flanges 51 and 66 is equal to the internal diameter of the sheath body so that the flanges abut the outermost edges of the metal corrugations to constrain the metal corrugations against longitudinal displacement caused by the ferrules exerting outwardly directed forces against these corrugations in response to grip pulling.

To permit longitudinal insertion of each threaded ferrule end through its corresponding end cap, the internal diameter of the opening at the cap flanges 51 and 66 is also made slightly greater than the root diameter of the ferrule threads. The male threads can then be rotated past the flanges 51 and 66 of the end caps into threaded engagement with the ferrule threads in the sheath body. The end caps 52 and 65 will be fixed to the sheath body and, in turn, constrain the metal corrugations against both longitudinal and radial separations and displacements. As mentioned above, to hold the end caps 52 and 65 in forceful abutting relationships with the opposite hollow ends of the sheath body, the flanges 51 and 66 are abutted by the shoulder 28 and the collar 61, respectively, provided on the ferrules 27 and 56, respectively.

In the illustrated embodiment of this invention, the mesh sleeve 16 is split throughout substantially its entire length, having a series of opposed loops defining the split in the sleeve. This embodiment is advantageously used for a plurality of cables with a plurality of connectors at the end thereof which are beyond the regular expansion diameter of a closed sleeve. The split could also extend up to the collar 61.

With the loops separated, a plurality of fragile cables and connectors can be maneuvered through the ferrule 56 and into the sheath 12 via the rearward open end of the sheath and received therein. The split sleeve 16 is wrapped around the cables extending from the sheath 12 and closed, for example, by strand 19 lacing up the opposed series of loops defining the opposed edges of the slit in the sleeve. After lacing is accomplished, the sleeve 16 can be axially stretched which results in a radial compression thereof into a gripping engagement with the cables received therein. The strand 19 can be of any suitable material such as a flat braided polyester and is advantageously laced by using a conventional lacing needle. The sleeve 16 may be partly double braided near the ferrule 56 and partly single braided toward its trailing end to enhance the gripping of the small sized cables in the mesh. The sheath may have a large enough internal diameter to accommodate at least three connectors in any positional arrangement.

With partially or fully closed mesh grips, a smooth, tubular feed tube may be used to facilitate the process of inserting the cable longitudinally through the sheath. Since the ferrule 56 can be detached by counter rotation from the rearward end of the sheath body, the detachment of the mesh grip from the sheath body 21 allows the feed tube to pass completely through the frontward open end of the mesh sleeve and the ferrule 56 leaving the connectors free to be manually grasped and inserted into the rearward end of the sheath. The reattachment of the ferrule 56 in the sleeve by appropriate rotation reestablished the threaded union of the grip. Although the sheath body 21 is disclosed herein as formed of a substantially flexible material a sheath formed of a rigid material may also be provided with a detachable coupling which may be a locking or threaded connection with a detachable coupling, as disclosed herein, to facilitate the process of loading of the cable connectors into the protective sheath body portion, as will be apparent.

While one advantageous embodiment has been chosen to illustrate the invention, it will be understood by those skilled in the art that various changes and modifications can be made therein without departing from the scope of the invention as defined in the appended claims.

What is claimed is:

1. A grip for elongated objects such as cables and the like, comprising:
   a tubular body for housing one end of the object, said body having opposite forward and rearward end portions and a longitudinal axis and being elongated in a direction parallel to said axis,
   said body including a substantially flexible wall portion between said forward and rearward end portions for bending in directions transverse to said longitudinal axis and providing therein a chamber elongated in a direction parallel to said longitudinal axis and having an open end communicating with the rearward end portion of said body,
   means coupled to the forward end portion of said body for applying tensile force to said body; and
   a gripping device coupled to the rearward end portion of said body for holding the object in said chamber while tensile force is applied to said means.

2. The grip as claimed in claim 1 wherein said tubular body comprises an outer sleeve of a substantially flexible material and an inner winding disposed substantially helically about said longitudinal axis.

3. The grip as claimed in claim 2 wherein said gripping device includes a hollow, threaded end portion for threadedly engaging the inner helical winding on the rearward portion of said body.

4. The grip as claimed in claim 3 wherein the inner helical winding of said body forms a female thread and wherein said threaded end portion of said gripping device has a male thread thereon for threadedly engaging the female thread on said body.

5. The grip as claimed in claim 1 wherein said grip includes an inwardly tapering nose portion joined to the forward end of said body and wherein said means is rotatably coupled to said nose portion.

6. The grip as claimed in claim 5 wherein said means comprises an elongated shaft extending into said nose portion substantially concentric with the longitudinal axis of said body, and a ball bearing mounted in said nose portion for mounting said shaft for rotation about said longitudinal axis.

7. The grip as claimed in claims 1 or 2 wherein said gripping device is detachably coupled to said rearward end portion of said body.

8. The grip as claimed in claim 7 wherein said gripping device comprises an open mesh sleeve which surrounds portions of the object and contracts inwardly to grip such portions when the body is pulled forwardly by said means.

9. The grip as claimed in claim 8 wherein said rearward end of said body includes an internally threaded portion and wherein said gripping device includes an externally threaded portion for threadedly engaging said internally threaded portion of said gripping device.

10. The grip as claimed in claim 9 wherein said externally threaded portion of said gripping device includes a circumferential shoulder for restraining the rearwardmost inner winding of said tubular body against longitudinal, rearward displacement.

11. A grip for elongated objects such as cables and the like, comprising:
    a hollow, tubular body having opposite forward and rearward end portions and a longitudinal axis and being elongated in a direction parallel to said axis, said body providing therein an elongated chamber having an open end communicating with the rearward end portion of said body for receiving one end of the body;
    means coupled to the forward end portion of said body for applying tension to said body in generally forward directions,
    a gripping device coupled to the rearward portion of said body for gripping the object when the body is tensioned by said means, and
    means for detachably coupling said gripping device to said rearward portion of said body.

12. The grip as claimed in claim 11 wherein said tubular rearward portion of said body comprises a threaded section and wherein said gripping device includes a forward threaded end section threadedly engaging the rearward threaded section of said body.

13. The grip as claimed in claim 12 wherein said threaded section of said body comprises an inner metallic corrugation forming a helical female thread and wherein said threaded end section of said gripping device comprises a ferrule having a male thread thereon for threadedly engaging said female thread.

14. Apparatus for gripping elongated objects such as cables and the like, comprising:
    an open mesh sleeve for gripping the object inserted therein, said sleeve having respective draft and trailing end portions;
    a flexible, hollow sheath having respective draft and trailing ends, the trailing sheath end rotatably coupled to the draft end portion for applying a tensile force component to said mesh sleeve, said sheath circumferentially enclosing one end of the gripped object; and
    means for manually detachably coupling the trailing end of said sheath to said draft end portion of said mesh sleeve.

15. The apparatus as claimed in claim 14 wherein the coupling means comprises a rotatable coupling.

16. The apparatus as claimed in claim 15 wherein the rotatable coupling comprises mating male and female threaded members.

* * * * *